United States Patent Office 2,981,751
Patented Apr. 25, 1961

2,981,751
OXIDATION WITH A CALCINED SOLID CATALYST

Willis C. Keith, Lansing, Ill., Carl D. Keith, Summit, N.J., and Emmett H. Burk, Jr., Hazel Crest, Ill., assignors to Sinclair Refining Company, New York, N.Y., a corporation of Maine No Drawing. Filed Feb. 25, 1958, Ser. No. 717,336

6 Claims. (Cl. 260—524)

The present invention relates to the oxidation of substituted aromatic compounds and more specifically the invention pertains to the liquid phase oxidation of aromatic compounds having at least one aliphatic, cycloaliphatic or partially oxidized aliphatic or cycloaliphatic substituent attached to the aromatic nucleus. The oxidation is conducted in the presence of an oxygen-containing gas and a calcined solid oxidation catalyst.

In the past numerous methods have been attempted to bring about the production of various oxygenated compounds by the air oxidation of substituted aromatics and especially the conversion of xylenes to toluic and phthalic acids. These methods have included both catalytic and non-catalytic procedures conducted in either the liquid or the vapor phase. Generally, the most useful of these procedures have been those wherein the oxidation of the aromatic compound was conducted in the liquid phase in the presence of a catalyst and an oxygen-containing gas and those effected through use of nitric acid as the oxidizing agent. In the air oxidation procedures the catalyst is usually in the form of a soluble salt such as cobalt toluate or naphthenate and is in solution in the reaction mixture. The oxidation of aromatic compounds by these soluble catalyst procedures has proven effective in certain instances. However, due primarily to the solubility of the catalyst salt in the reaction mixture, there are certain disadvantages in the system and these include, among others, the loss of the catalyst from the reaction system thus leading to increased operational cost, and the necessity of providing elaborate catalyst recovery facilities to separate the catalyst and reaction products. We are aware of the disclosure in U.S. Patent No. 1,-789,924; however, this patent does not describe the advantageous system of our present invention.

In accordance with the present invention, we provide for the liquid phase oxidation of substituted aromatic compounds by contacting them in the presence of an oxygen-containing gas with a catalyst obtained by calcination of a material containing a promoting metal of atomic number of 24 to 28 supported on a solid inorganic base consisting essentially of silica, alumina, or their mixtures. By proceeding in this manner, we substantially eliminate many of the heretofore encountered difficulties in liquid phase oxidation reactions such as catalyst losses from the system and the necessity of providing elaborate means for the separation of the catalyst and the reaction product, and we obtain substantial yields of oxygenated products such as ketones or acids with the exact nature of the products depending upon the severity of the reaction conditions and the feedstock employed.

The substituted aromatic compounds oxidized in the invention are those wherein the aromatic nucleus, preferably a benzene ring, is substituted with at least one aliphatic or cycloaliphatic side chain and it can be substituted with as many as six such side chains, if desired. The side chain substituent contains at least one carbon atom and generally not more than six. Preferably the side chain contains from 1 to 4 carbon atoms and most advantageously is methyl. The side chain substituent can be partially oxidized if desired, for instance, it can contain ketonic or aldehydic radicals and these will be oxidized, for instance, to carboxylic acids. Also, the side chain can be connected at both ends to separate carbon atoms of the aromatic nucleus thus forming a second ring structure attached to the aromatic nucleus. When the side chain is an alkyl or cycloalkyl group, it has at least one hydrogen atom on the alpha carbon and in the case of partially oxidized side chains, this is the preferred structure although others can be employed. Illustrative compounds which can be utilized as feedstocks in the present invention include toluene, butylbenzene, xylene, cumene, durene, dibutylbenzene, acetophenone, propiophenone, benzaldehyde, tolualdehyde, Tetralin, etc.

The conditions for the oxidation reaction are generally conventional in the liquid catalyst art. The elevated temperature can be in the range of about 50 to 350° C. and preferably about 100 to 250° C. with a pressure on the system sufficient to insure a substantial amount of the reactants in the liquid phase. For instance, pressures in the range of about 0 to 3000 p.s.i.g. and preferably about 0 to 500 p.s.i.g. will usually suffice. In general the space velocity will be from about 0.1 to 10 WHSV (weight of feed per weight of catalyst per hour) with the catalyst being sufficient to provide a substantial catalytic effect. A diluent can also be provided in the oxidation system if desired although its presence is not necessary. When provided, the diluent must, of course, be stable under the reaction conditions and must be inert to the reactants under these conditions. Suitable diluents are polar organic liquids such as acetic acid or other low molecular weight monocarboxylic acids or the diluent can be benzene or other hydrocarbon if desired. The diluent can be provided in any quantity with no particular advantage being obtained by having amounts outside of the range of about 0.1 to 10 volumes per volume of feed.

The catalyst for use in the present invention is derived by calcining an inorganic base having deposited thereon catalytic amounts of a promoting metal component. The catalyst can be prepared as by conventional procedures such as the co-precipitation of the promoting metal component with the base in hydrated form followed by calcination, or the base can be preformed, calcined if desired, and then the promoting metal component deposited thereon as by contact with a salt solution of the metal component followed by calcination. In either method the base precursor, as a hydrate or a previously calcined hydrate, containing the promoting metal must be activated as by calcination prior to use in the oxidation reaction. Thus the catalyst base calcined for use in the present invention is comprised predominantly of alumina, silica, or mixtures thereof and preferably the calcined material contains at least some amount of silicate or aluminate of the promoting metal. The base can also contain minor amounts of other inorganic materials, such as magnesia or other inorganic oxides.

In forming the base by precipitation from an aluminum salt, the aluminum in the salt can be in the catonic or anionic portion. If the aluminum is in the anionic part, for instance as in sodium aluminate, and the aluminum salt is combined with a compound of the promoting metal, for instance cobalt nitrate, the resultant precipitate will, upon calcination, be predominantly in the spinel or aluminate form; and if the aluminum in the salt is cationic, the resultant precipitate, will upon calcination, be predominantly in the alumina form. Likewise, when silica is desired in the inorganic base, its form can be controlled in a similar manner to provide predominantly silicate or silica, as the case may be.

The catalytically active metal component can be impregnated or deposited on the solid inorganic base and this can be done as by mixing the base with an aqueous solution of a water-soluble salt of the desired catalytic metal to absorb all or a part of the metal-containing solution in the base particles or alternatively, we can precipitate the active metal component on the base through neutralization of a slurry of the salt of the desired base and the acid salts of the catalytic metal. In either case, or if prepared by some other method, the catalyst must be calcined before use in our oxidation system with the calcination being conducted at a temperature of about 250 to 700° C., preferably at least about 350° C., for a time sufficient to remove the predominant amount, but not all, of the water of hydration.

The promoting metal component of the catalyst can be a metal or mixture of metals having atomic numbers from 24 to 28, for instance, chromium, manganese, iron, cobalt, and nickel, with cobalt being preferred. Generally, the metal is deposited on the base as the oxide or in a form that gives the oxide upon calcination, although other combined forms of the metal can be employed. The promoting metal will be provided in the catalyst in amounts of about 0.1 to 2.0 times the weight of the supporting base with a ratio of about 0.5 to 1.5 weights of promoting metal to one weight of base being preferred. These amounts are calculated on the basis of the promoting metal and base oxides. In some cases, it may be found desirable to provide oxidation initiators in the system and these can be various peroxides, or free radical-producing substances such as ketones, etc.

The present invention may be more fully understood by reference to the following specific examples which are not to be considered as limiting the scope of the present invention.

Example I

A typical catalyst useful in the present process was prepared as follows: A solution, noted A, was made up and consisted essentially of 995 ml. of cobalt nitrate (200 grams of Co) and 5,500 grams of aluminum nitrate ($Al[NO_3]_3 \cdot 9H_2O$ equal to 746 grams Al) diluted in 18 liters of water. A second solution, noted B, and consisting essentially of 3,360 grams of sodium carbonate was diluted with 32 liters of water. The sodium carbonate solution was made up in a 35 gallon Pfaudler kettle and was heated to a temperature of about 85 to 90° C. Solution A was then added to solution B over a thirty-minute period with vigorous agitation. After the precipitation was complete, the heat was discontinued and the slurry stirred for an additional thirty minutes. The slurry was then filtered through a plate and frame press, and the filter cake washed with hot deionized water and run dry with air. The filter cake was reslurried and rewashed an additional four times wih hot deionized water, and then dried in a forced air oven at 105° C. The dried hydrate cake was then ground to a powder and calcined at 350° C. Upon analysis the catalyst was found to contain 18.4 percent cobalt.

Example II

A ten gram sample of the catalyst described in Example I was ground to pass 200 mesh and calcined at 510° C. for two hours. This calcined catalyst was charged to a one-gallon stirred autoclave along with 200 grams of paraxylene and 1800 grams of glacial acetic acid. Air was introduced into the autoclave until a pressure of about 800 p.s.i.g. was obtained and this pressure was maintained throughout the run. The effluent gas was metered at a rate of 7 cubic feet per hour. The autoclave was then rapidly heated to about 175° C. and maintained there for a period of about six hours. At the end of this time, the reactor was cooled to about 75° C. and the contents discharged. The reaction product and catalyst were filtered and the product yielded 150 grams of para-toluic acid and 50 grams of terephthalic acid.

Example III

A ten gram sample of the catalyst described in Example I was ground to pass 200 mesh and then calcined at 510° C. for two hours. This catalyst, along with 150 grams of acetophenone, was charged to a pressure reactor and air was introduced until a pressure of 400 p.s.i.g. was obtained. This pressure was maintained throughout the reaction and the effluent gas was metered at the rate of 3.3 cubic feet per hour. The reactor was heated to about 265° C. and maintained there for a period of about 2 hours. At the end of this period, the reactor was cooled to ambient temperature and the product extracted with an aqueous potassium hydroxide solution. The extract was acidified and the benzoic acid removed by filtration. The acid was dissolved in boiling water and allowed to cool to room temperature. A white crystalline product was removed by filtration and dried at 110° C. A yield of 25 grams of pure benzoic acid (M.P. 123° C.) was obtained. The alkali-insoluble material was distilled and 75 grams of unreacted acetophenone was recovered.

Example IV

A cobalt silicate catalyst useful in the present method was prepared as follows: 1077 grams of cobalt nitrate ($Co[NO_3]_2 \cdot 6H_2O$) were dissolved in water and diluted to about 6 liters. This solution is noted A. A second solution, noted B, was prepared by dissolving in about 6 liters of water 1052 grams of sodium meta-silicate ($Na_2SiO_3 \cdot 9H_2O$). Solutions A and B were simultaneously added to 4 liters of water and the pH maintained at about 7.5. A minor amount of dilute $HNO_3$ was added to adjust to pH 7. The resultant precipitant was washed and dried by the same procedures as described in Example I and the dried hydrated catalyst calcined at about 575° C. Analysis indicated that the catalyst contained about 37 percent cobalt. X-ray diffraction patterns indicated small crystals having a silicate structure. A nitrogen area of 325 square meters was found for the catalyst.

Example V

An eight gram sample of the catalyst described in Example IV was ground to pass 200 mesh and calcined at about 575° C. for two hours. This catalyst, along with 400 grams of Tetralin, was charged to a reactor. The reactor was heated to about 140° C. and 0.3 ml. of cumene-hydroperoxide was added to the reaction mixture. Pure oxygen was introduced to the reactor at a rate of about 0.5 cubic foot per hour and the reaction was controlled at the temperature of about 140° C. for a period of about two hours. Over 80 percent of the oxygen was converted to oxidation products and about 20 mls. of water were removed during the course of the reaction. After the two-hour period, the oxygen flow was discontinued and the reactor allowed to cool to room temperature. The catalyst was removed by filtration and the product distilled in a spinning band column. Analysis showed that about 40 percent of the Tetralin had been converted to oxidation products with the major product being alpha-tetralone having a boiling point of about 133° C. at 100 mm.

Example VI

A 120 gram sample of catalyst as described in Example I was granulated to give 8/14 mesh particle size material which was calcined for two hours at 510° C. The catalyst was charged to a fixed bed, steel jacketed reactor. Air was introduced through a porous diffusion plate at the bottom of the reactor at a rate of 0.75 mole of oxygen/mole of o-xylene feed. The o-xylene was introduced above the diffusion plate at a rate of 1.6 WHSV. A constant pressure of 800 p.s.i.g. was maintained and the jacket temperature was controlled at 210°

C. throughout the run. The temperature of the catalyst bed varied from 210° C. to 225° C. During the reaction the off-gases were passed to a condenser operating at about 20° C. with the condensate containing xylene and water being returned directly to the reactor. Gas samples were taken at frequent intervals and analysis indicated that over 85 percent of the oxygen was being converted to oxidation products. After several hours of operation the collected product was distilled. Distillation of the product indicated that 30.6 percent of the o-xylene feed had been converted to oxidation products. The following yields of products were obtained.

| Product | Weight Percent (Based on Xylene Feed Converted) |
|---|---|
| Tolualdehyde | 10.3 |
| Toluic Acid | 68.0 |
| High Boiling Neutrals | 34.7 |

For this particular operation to make o-toluic acid, the tolualdehyde and neutral materials could be recycled with fresh xylene feed, to yield toluic acid as well as some phthalic acid.

In a similar run, except that the WHSV was 0.8 and the oxygen was supplied at the rate of 1.5 moles per mole of o-xylene, the utilization of the oxygen was 43.5 percent and the conversion of the xylene was approximately 32 percent. This operation was repeated with the water being removed from the condensate before its return to the reactor, and under these conditions there was essentially 100 percent utilization of the oxygen and at least 70 percent conversion of the o-xylene. These results illustrate that when operating in the absence of an organic polar solvent, it is preferred to remove substantially all of the water from the reaction zone as it is formed. When so doing, it may be advantageous to employ a hydrocarbon solvent, for instance an aromatic hydrocarbon such as benzene, to facilitate handling of the products, particularly when conversion of the feedstock is over 50 percent.

We claim:
1. In a method for the oxidation of a benzene compound having 1 to 6 carbon atoms in a side chain selected from the group consisting of alkyl, cycloalkyl and partially oxidized alkyl chains, the steps comprising contacting said compound in the liquid phase and in the presence of molecular oxygen with a calcined solid oxidation catalyst containing a material selected from the group consisting of the silicates and aluminates of catalytic oxidation promoting metals having an atomic number of 24 to 28, said catalyst being obtained by calcination at a temperature of about 250 to 700° C. of a hydrous solid inorganic base selected from the group consisting of alumina and silica and containing a catalytic amount of the promoting metal component, said contact being at a temperature of about 50 to 350° C. and under a pressure sufficient to maintain the liquid phase.

2. The method of claim 1 wherein the promoting metal is cobalt.

3. The method of claim 1 in which water is removed from the reaction zone substantially as it is formed.

4. In a method for the oxidation of xylene the steps comprising contacting said xylene in the liquid phase and in the presence of molecular oxygen with a calcined solid oxidation catalyst containing cobalt aluminate, said catalyst being obtained by calcination at a temperature of about 250° to 700° C. of alumina containing a catalytic amount of cobalt prepared by the coprecipitation of cobalt with alumina in hydrated form, said contact being at a temperature of about 100 to 250° C. and under a pressure sufficient to maintain the liquid phase.

5. The method of claim 4 in which water is removed from the reaction zone substantially as it is formed.

6. The method of claim 1 wherein the side chain has at least one hydrogen atom on the alpha carbon atom.

References Cited in the file of this patent
UNITED STATES PATENTS

| 1,789,924 | Binapfl | Jan. 20, 1931 |
| 2,005,183 | Flemming et al. | June 18, 1935 |
| 2,723,994 | Haefele et al. | Nov. 15, 1955 |

OTHER REFERENCES

Weissberger: Technique of Organic Chemistry, vol. II, pages 10–13 (1956).